Oct. 17, 1939. C. H. AYARS 2,176,448
CAN FILLING MACHINE
Filed Feb. 5, 1938 9 Sheets-Sheet 1

Fig.1.

INVENTOR
CHARLES H. AYARS.
BY
ATTORNEY

Oct. 17, 1939.  C. H. AYARS  2,176,448
CAN FILLING MACHINE
Filed Feb. 5, 1938  9 Sheets-Sheet 2

INVENTOR
CHARLES H. AYARS,
BY
ATTORNEY

Oct. 17, 1939.   C. H. AYARS   2,176,448
CAN FILLING MACHINE
Filed Feb. 5, 1938   9 Sheets-Sheet 3

INVENTOR
CHARLES H. AYARS.
BY
ATTORNEY

Oct. 17, 1939.  C. H. AYARS  2,176,448
CAN FILLING MACHINE
Filed Feb. 5, 1938  9 Sheets-Sheet 5

INVENTOR
Charles H. Ayars.
BY
ATTORNEY

Oct. 17, 1939.  C. H. AYARS  2,176,448
CAN FILLING MACHINE
Filed Feb. 5, 1938  9 Sheets-Sheet 7

INVENTOR
CHARLES H. AYARS.
BY
ATTORNEY

Oct. 17, 1939.                C. H. AYARS                2,176,448
                          CAN FILLING MACHINE
             Filed Feb. 5, 1938              9 Sheets-Sheet 9

INVENTOR
CHARLES H. AYARS.
BY
ATTORNEY

Patented Oct. 17, 1939

2,176,448

UNITED STATES PATENT OFFICE 2,176,448

CAN FILLING MACHINE

Charles H. Ayars, Salem, N. J., assignor to Ayars Machine Company, Salem, N. J., a corporation of New Jersey Application February 5, 1938, Serial No. 188,825

25 Claims. (Cl. 226—97)

This invention relates to can filling machinery, and has special reference to a machine of the type which fills cans with predetermined quantities of liquid, viscous or semi-plastic materials, in continuous succession. The machine is intended to fill cans with liquids, such as oils, tomato juice, etc., as well as semi-plastic materials, such for instance, as dog food and the like.

The object of the invention is to provide a can filling machine in which materials of accurate predetermined quantity are withdrawn from a supply and forced into cans which are fed in continuous succession to be filled.

A further object of the invention is to provide vacuum means for withdrawing the predetermined quantities from the supply.

Another object of the invention is to provide means whereby cans of different sizes may be filled without the splashing of material from the cans.

Another object of the invention is to provide novel means operated by the can to be filled for insuring a deposit of material in that particular can, and in which when no can is admitted to operate said means, no deposit of material will be made.

A still further object of the invention is to provide novel means for simultaneously adjusting the amount of material to be filled into each can.

Another object is to so construct such a mechanism as to provide free and facile means for cleansing the parts when completing a run on said machine.

According to the invention, the can filling machine comprises a frame, a central shaft, means for rotating said shaft, a can table mounted on said frame, means for feeding cans in succession to said table, means above said table for properly spacing said cans, a rotating hopper communicating with a stationary supply chamber, a discharge port in said supply chamber, a turret having a plurality of pockets arranged for rotation around said chamber by said shaft, an admission port in each of said pockets horizontally aligned with the discharge port in said chamber, a discharge port in the bottom of each pocket, a sealing plate having a discharge opening removed from the discharge port in said chamber and adapted to seal the discharge ports in each pocket during the communication of the admission port of said pocket with the discharge port of said chamber, a plunger in each pocket, a track, a roller operatively connected with each of said plungers, said track arranged in elevation to reciprocate the rollers engaged therewith, and to elevate said plungers during the communication between the pocket admission port and chamber discharge port and lower said plungers during communication between the discharge port of said pocket and the discharge opening of said sealing plate, whereby the contents drawn into said pocket by the upward movement of said plunger are deposited into said can by the downward movement thereof.

The machine is also provided with means for bodily raising or lowering the supply chamber and turret mechanism, so as to provide the proper amount of space between the can table and mechanism for cans of different sizes.

The machine may also be provided with a switch located in the track, and which said switch is engaged by each incoming can to retain the roller of the pocket from which the individual can will be filled upon the track, and to switch the roller from said track to prevent the operation of the plunger, and thereby the admission and discharge of material in the absence of a can.

The drawings illustrate an embodiment of the invention, and the views therein are as follows:

Figure 6 is a side view of the operating mechanism for the central shaft and for the can feeding mechanism, and incorporates a partial view of the mechanism for operating the switch in the cam track.

Figure 1:
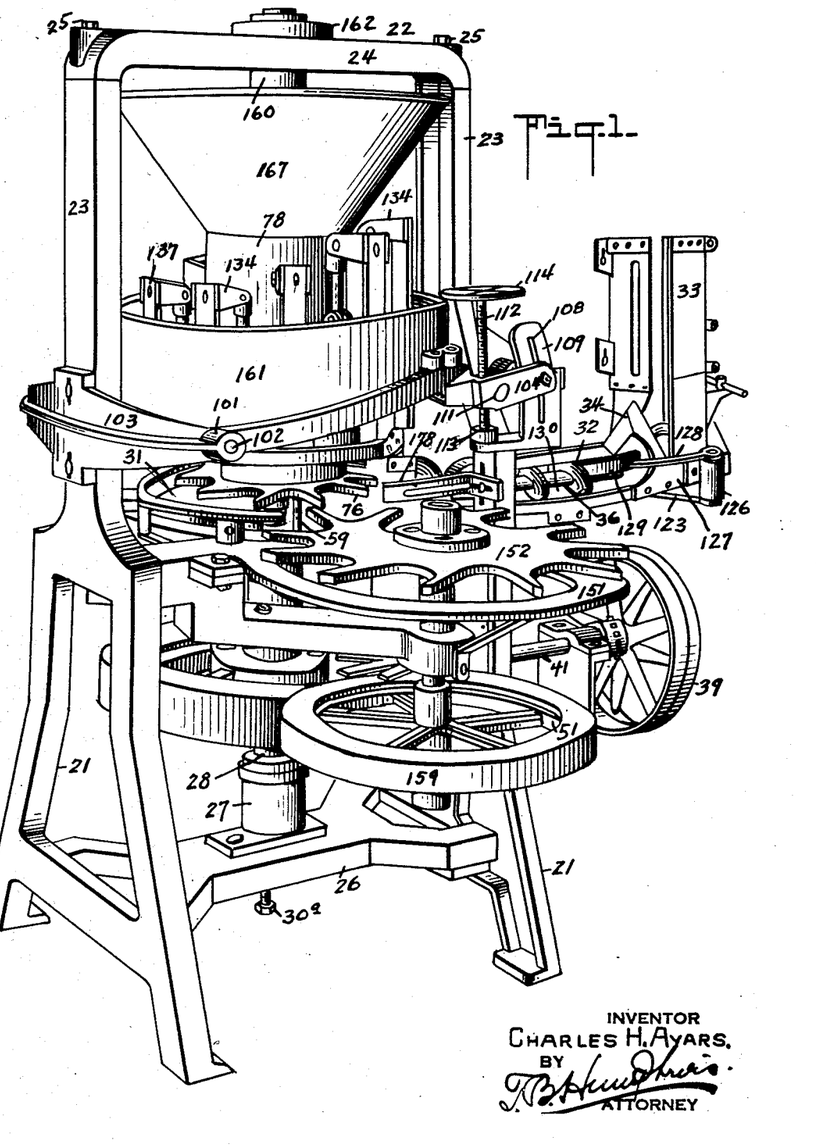
Figure 1 is a perspective view of the machine with the chains for driving the can feeding mechanism omitted.

As illustrated in the drawings, the machine has a frame 21 provided with an arch 22 comprising vertical standards 23 and horizontal bridging part 24. This bridging member is secured by bolts 25, shown in Figure 1, to the upright standards 23, and may be removed so as to permit the can filling mechanism to be disorganized, etc., either for repair and renewal of parts, or for changing of parts to provide modified arrangements.

The lower part of the frame is provided with a support 26 with a depressed well 26ª, and has a ferrule 27 mounted thereon for receiving the shaft 28 and supporting the bearing 29. The lower wall of the well 26ª has a screw threaded hole 30 for receiving a bolt 30ª whose upper end rests against the bottom of the shaft 28 for adjustment thereof, as later explained. Above the support 26 is a can table 31 fastened to said frame, and this table is adapted to support the cans A, which are fed thereto by the worm 32 of the can feeding mechanism. Can feeding mechanisms of various designs have been shown and described in several of my former United States Letters Patent, and suffice to say that there is here illustrated mechanism comprising a magazine 33 (see Figures 1, 2 and 6) into which the cans are horizontally fed, a tilting plate 34 and worm 32. The latter operates on a shaft 36 provided with a sprocket wheel 37 operated by the chain 38. This chain extends upward beyond the sprocket 37, and over a sprocket 40 on an adjustable bracket 40ª, which permits the chain to be tightened when desired.

The machine illustrated and described herein is operated by a belt extending over the pulley 39 on the drive shaft 41, but this type of drive is illustrative, and not essential, as the machine may be driven by a motor, or by any other desirable means. The inner end of the shaft 41 is provided with a bevel pinion 42 meshing with the large bevel gear 43 keyed to the shaft 28 at 44.

The shaft 41 is mounted in a bearing 46 in the frame 21, and in a bearing 47 on the bearing bracket 47ª, which is also mounted on said frame The large bevel gear 43 has a ring gear 48 fastened on its upper face by means of the bolts 49. This gear meshes with the gear 51, which operates the can delivery mechanism, as later described. Above the ring gear 48, and surrounding the shaft 28, is an externally threaded sleeve 52. This sleeve is provided with an annular flange 53, which bears by its upper end against a pad 54 on the under face of the can table 31.

The screw sleeve 52 has a hand wheel 56 mounted thereon and adjustable in height on said threads, while a heavy spiral spring 57 has its lower end bearing against the body of said hand wheel, and its upper end bearing against a collar 58 surrounding said screw threaded sleeve, but not connected therewith. This collar 58 has the lower ends of two or more vertically disposed bars 59 secured thereto by the threads 61, and said bars extend upward through holes 62 in the annular flange 53 of the threaded sleeve 52, and through aligned holes 63 in the can table 31, and the upper ends of said bars are screw threaded, as at 63, into a collar 66, which surrounds and is fastened to the depending bushing 67 of the stationary sealing plate support 68 by a key in said collar fitting into the extended keyway 67ª.

The collar or disk 66 is provided with a ball race 69 having balls which contact the part 71 engaged by the depending bushing 72 of the turret plate 73, said bushing 72 being around the depending bushing 67 of the sealing plate support 68 and rotatable thereon.

The depending bushing 72 of the plate 73 has the flange 74 of the star wheel 76 connected therewith, so that said star wheel rotates in unison with said turret plate. The turret plate is provided with a peripheral upstanding flange 77 to retain in close relationship therewith, the bottom peripheral edge of the pocket casting 78 and rotates therewith by virtue of the key 77ª. This pocket casting or turret 78 is shown in detail in Figures 9 and 10, and it is provided with a central upstanding collar 79 which may be secured to the shaft either by spline in the keyway 81, shown in Figure 9, or by set screws 82, as shown in Figure 3.

Figure 3:
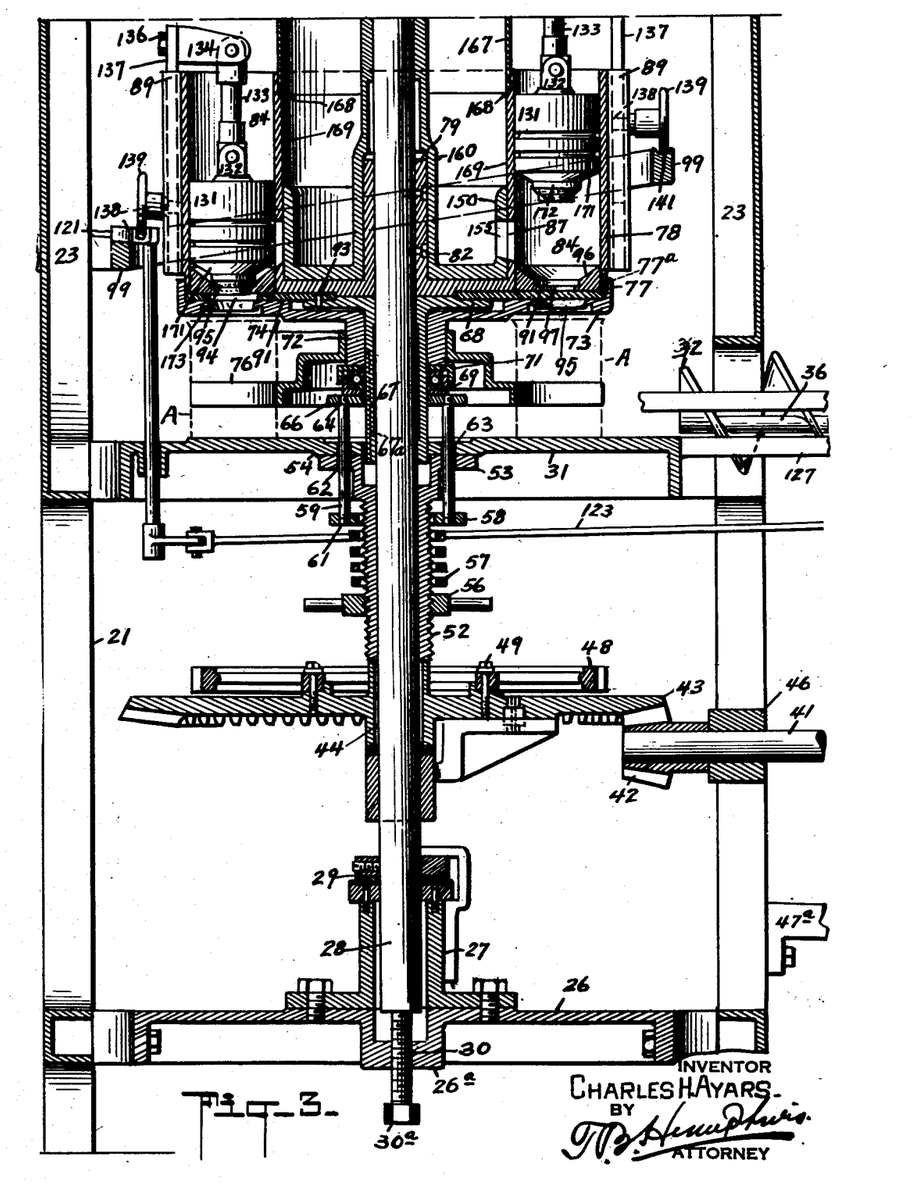
Figure 3 is a vertical sectional view of the lower part of the machine showing a part of the operating means for the track switch, Figure 3-A is a view of the upper part of the machine showing the arch with some of the parts in vertical section.
Figure 3A:
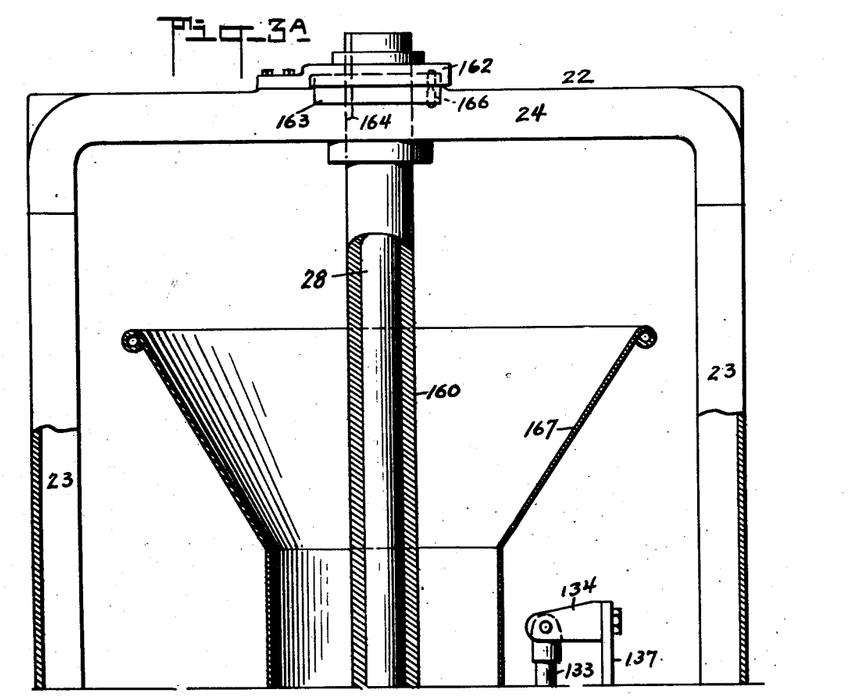
Figure 9:
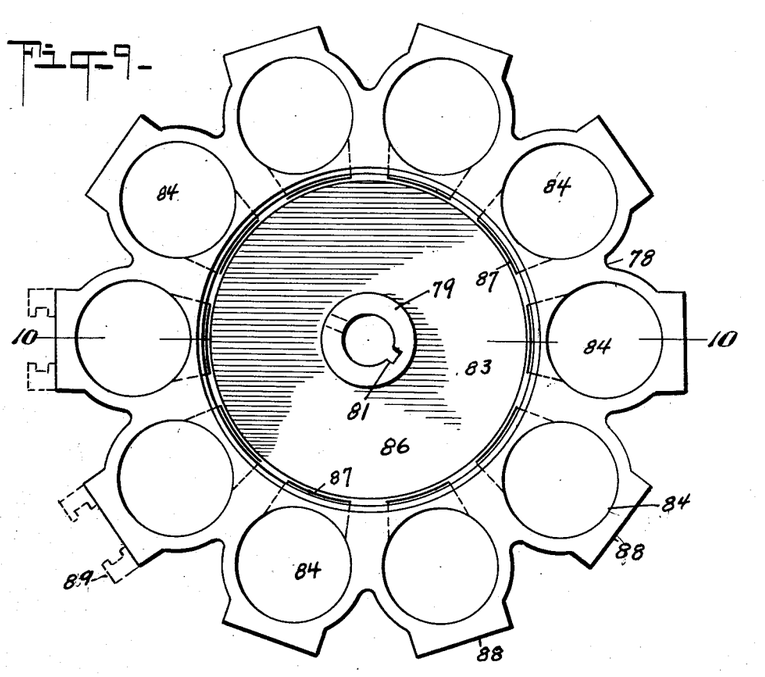
Figure 9 is a top plan view of the turret having the measuring pockets, and shows, in dotted lines, two of the pockets provided with raceway means for receiving a bar mounted for vertical reciprocation to operate the plungers in said pockets.
Figure 10:
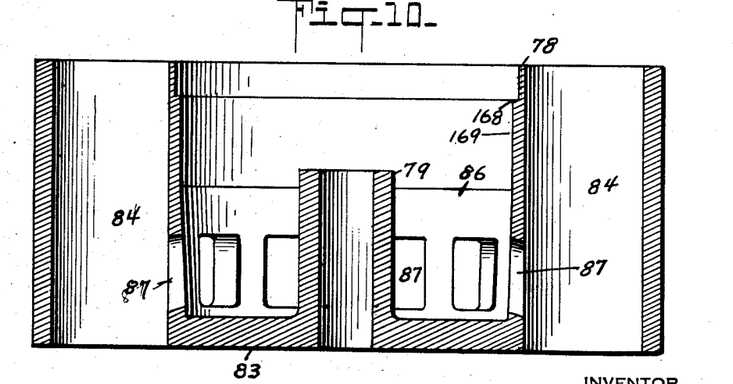
Figure 10 is a vertical sectional view on the line 10—10 of Figure 9.
Figure 11:
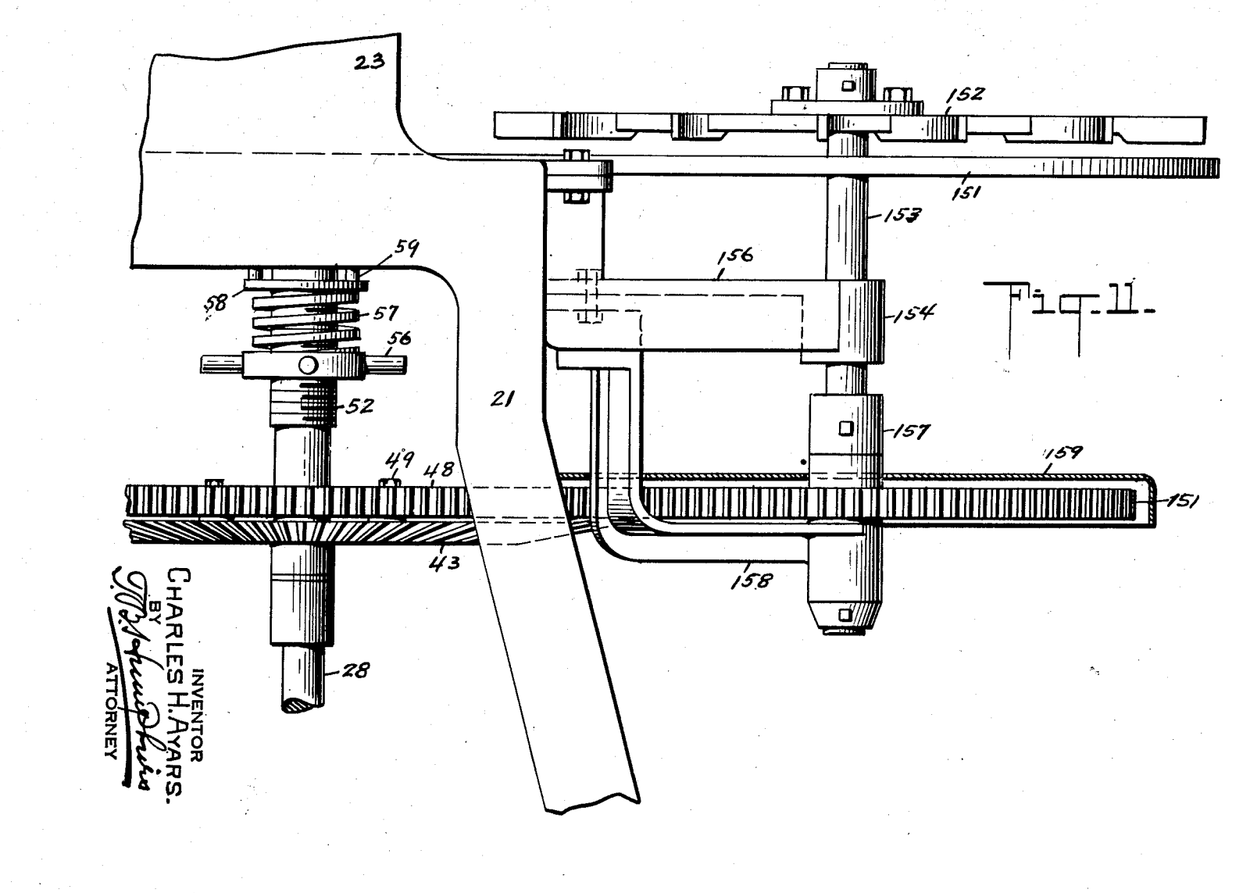
Figure 11 is a fragmentary side elevation showing the mechanism for operating the can delivery wheel.

This pocket casting has a horizontal annular web 83 extending out from said central upstanding collar 79, and is provided with a plurality of concentric pockets 84, so as to form with said upstanding collar 79 a concentric cup 86, each of the pockets 84 over an admission port 87 communicating with said cup 86, as clearly shown in Figures 3 and 10. The outer peripheral wall 88 of each of the pockets is squared, as shown in Figure 9, to provide a surface to which slotted guides 89 are fastened.

Figure 4:
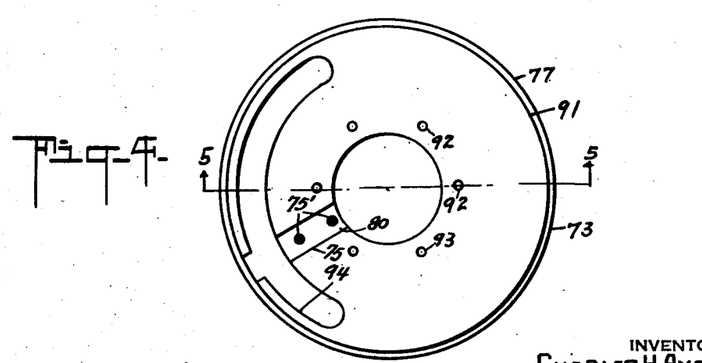
Figure 4 is a top plan view of the turret plate and sealing plate.
Figure 5:
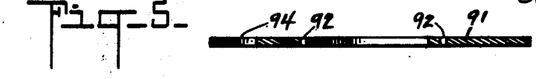
Figure 5 is a cross-sectional view of the sealing plate on the line 5—5 of Figure 4.

This turret or pocket casting rests upon the sealing plate 91, which is shown in detail in Figure 4. This plate has a series of holes 92 located concentrically for fastening the same by pins 93 to the sealing plate support 68, and is provided with a discharge opening 94 through which the material from said pockets is discharged into the cans A moved on the can table 31 by the star wheel 76. The discharge opening 95 in the turret plate 73 may be approximately the same size and shape as the radial diameter of the discharge opening 94 in the plate 91.

The turret plate 73 has a plate 75 fastened in any manner, such as by screws 75', for extending into and filling the opening 80 in the sealing plate 91 which said opening extends from the inner edge to the opening 94 and from the opening 94 through the periphery and permits the sealing plate to be withdrawn when the hand wheel 52 is operated to raise the hopper and associated parts.

Figure 7:
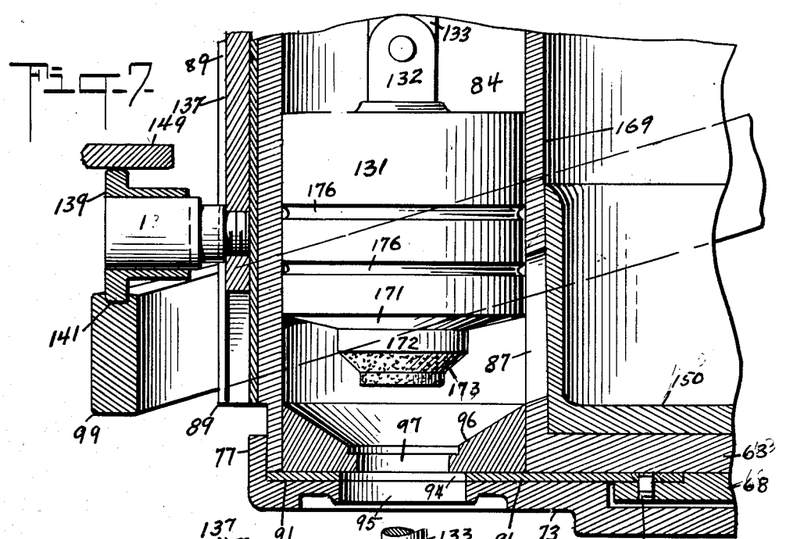
Figure 7 is an enlarged vertical sectional view of one of the pockets and attendant mechanism.
Figure 8:
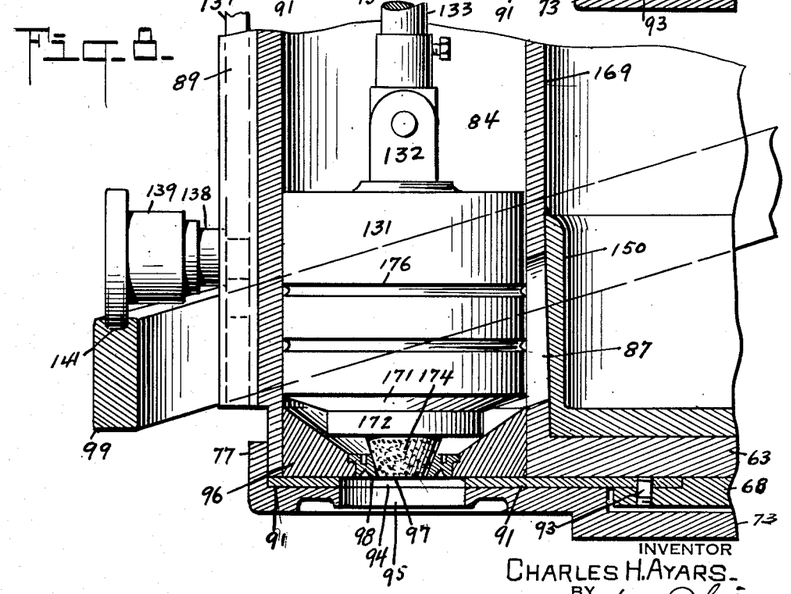
Figure 8 is a like view showing a bushing in the discharge port of the pocket, and a modified gasket member on the bottom of the plunger.

The pockets 84 may be provided with inserts 96, as shown in Figure 3, for restricting the opening at the bottom of said pocket, and providing a port 97, as shown in Figure 7, and if it is desired to further restrict the port 97, a bushing 98 may be placed therein, as shown in Figure 8.

A track 99 surrounds the turret or pocket casting and is concentric therewith. This track is provided with lugs (see Figure 13) 101 for pivotal connection at 102 on a bracket 103 connected to one of the upright standards 23, while the other end is provided with an arm 104 which has a bolt 107 in the end thereof adapted to move in an elongated slot 108 in the bracket 109 connected with the other standard 23 which said bolt can be tightened when regulation is attained. This arm has a threaded roller 111 through which a screw 112 extends, and whose lower end rests in a seat 113 on the inner end of the bracket 109. The upper end of the screw 112 is provided with a hand wheel 114 for the purpose of operating said screw to raise and lower the operating pitches of said track through the pivotal connection 102. The bolt 107 extending from the arm 104 through the elongated slot 108 of the bracket 109 may be provided with a spiral spring 116 resting against said bracket and against a washer 117 which is retained on said bracket by the nut 118 to steady said track against vibration of the machine.

Figures 2, 14:
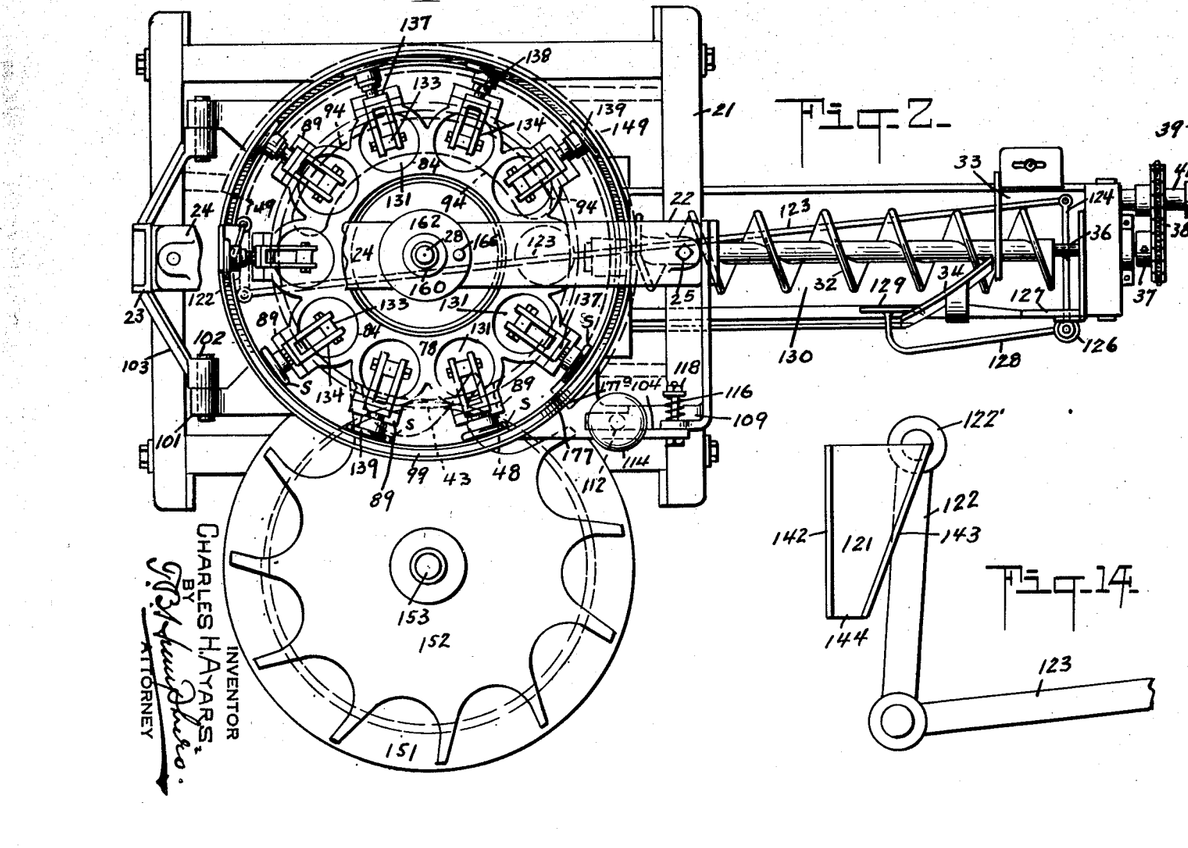
Figure 2 is a plan view of the machine with a part of the arch broken away, and with a hopper omitted, to illustrate the can operated switch for retaining the rollers, which operate the plungers on the cam track.
Figure 14 is a top plan view of the switch which operates in conjunction with the cam track and the operating mechanism is fragmentarily shown therewith.
Figure 12:
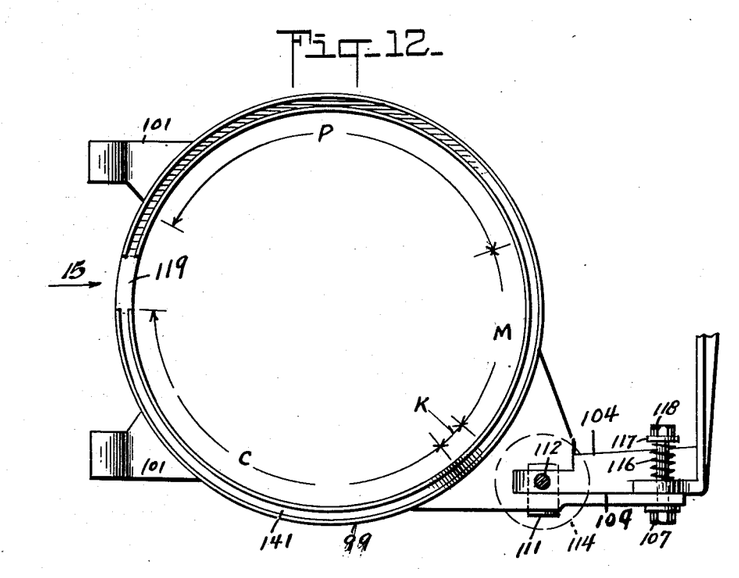
Figure 12 is a top plan view of the cam track showing the means for mounting the same, and for adjusting it to regulate the quantity of material to be taken into each pocket, and subsequently deposited into the cans.
Figures 13, 15:
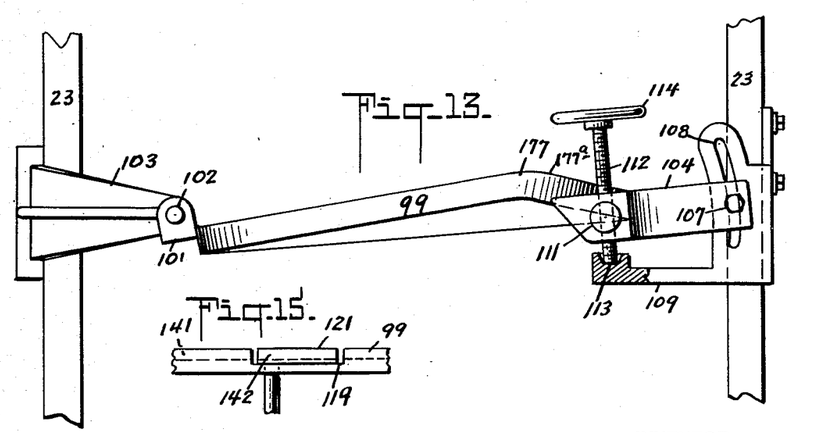
Figure 13 is a side elevation of the same showing the manner of mounting it.
Figure 15 is a fragmentary view showing the location of the switch of Figure 14 in the cam track, and is taken substantially at the point indicated by the arrow 15 in Figure 12 with the switch added.

The track 99 has a cut-out portion 119 (see Figures 12 and 13) to receive a switch 121 (see Figures 14 and 15). This switch is secured to a bushing 122' swingable on a pin by an arm 122 which arm is pivotally connected to a rod 123 (see Figures 2, 6 and 14). The rod 123 is pivoted to an arm 124 of a bell crank 126 also mounted on a fixed pin mounted on bracket 127, while the other arm 128 of said bell crank carries at its outer end a trigger 129 which extends into the can race 130, so that said trigger is engaged and operated by each and every can passing through the can feeding device.

Each of the pockets is provided with a plunger 131, and each plunger has upwardly extending lips 132 between which is received one end of a connecting rod 133, while the other end of said connecting rod is received in a bracket 134 secured by the bolts 136 to the reciprocating cross-head 137. The cross-head for each plunger consists of a bar reciprocally mounted in the slotted guides 89 on the finished faces 88 of the pockets 84, and each of said cross-heads is provided with a bearing spindle 138 upon which a flanged roller 139 is slidably mounted, that is to say, the roller is free to move longitudinally of the shaft 138 so that the flange of the roller 139 is moved out of the groove 141 in the track 99.

The track 99 is shown in detail in Figures 12, 13 and 15, and has a part extending approximately over the extent of the dimension C sloping upwardly from the cut-out part 119. The track has a downward slope, represented by the dimension K, and beyond this is a flat part or dwell, represented by the dimension M, beyond which is a uniform downward slope, represented by the dimension P.

The switch shown in detail in Figure 14 has an outer wall 142 and an oblique inner wall 143 providing at the forward end 144 of same sufficient space to permit the flange of the roller 139 to pass freely therebetween. The pocket whose plunger has the roller passing this switch is the pocket which will have its contents discharged into the can which, if present, is engaging the trigger 129 in the can feeding mechanism, and as that particular can operates the trigger 129, the parts hereinbefore explained operate the switch, so that said switch is in the position shown in Figure 2, and with the outer wall 142 of said switch practically contiguous with the outer part of the roller groove in the track 99. If, however, there is no can present in the can feeding mechanism to operate the trigger 129, the tension on the spiral spring 146 will hold this switch in a position where the roller will be diverted by the wall 142 which, in that instance, bridges the groove in the track 99 so that it leaves said track, and makes a complete revolution without operating the plunger in that particular pocket.

In Figure 2, four rollers, designated as "S", are shown diverted from the track 99. When the roller thus diverted again reaches the switch 121, the same will follow the direction of the inner flange 143, and if a can has operated the switch, just as the particular roller reaches the same, this roller being free to slide on its shaft 138, will be pushed outward by the inner wall 143, and directed onto the track 99.

By this mechanism, each can being fed through the can feeding mechanism operates the switch for the pocket and plunger which is to fill that particular can, and when the can is absent, the plunger does not take a charge of material; the plunger remaining in the bottom of said pocket during that revolution of the turret.

The spiral spring 146 has its one end connected to the strut 147 extending between the bearing 47 and the can feeding mechanism frame 127, while its other end is fastened to a collar 148 on the rod 123. Extending over the track 99 and approximately the arcuate length of the dimensions M and P is a bearing plate 149 which may engage the top of the roller 139 to force the same downward onto the level of the track 99 to insure the downward movement of the plungers 131 in accordance with the contour of the track. The can delivery table 151 is secured to the machine frame, and has a star wheel 152 mounted on a shaft 153 operating in a bearing 154 on the bracket 156 and a bearing 157 on the bracket 158. This large gear 51 may have a cover 159 over the same, as may all operating parts to prevent injury to the operator and other persons who chance to be in proximity to the machine. The track may also be provided with a shield 161 shown in Figure 1.

The pocket casting, shown in Figures 9 and 10, rests upon the sealing plate 91 which, in turn, rests on the turret plate 73 and within the upwardly extending flanges 77.

A magazine or valve member 150 fits within the cup 86 of the turret, and is provided with an elongated discharge port 155 aligned with the pocket admission ports 87. This port 155 is substantially the length of dimensions C and K in Figure 12, although the same may extend partially into the area of dimension M. This magazine or valve has a central concentric sleeve 160 which fits over the sleeve or bushing 79 of the pocket casting, and above the pocket casting sleeve. The sleeve on said magazine has a sliding fit with the shaft 28, while its upper end extends through the arch 24 of the machine frame, and through a bracket 162. A collar 163 is keyed to said sleeve at 164, while the collar is connected to the bracket 162 by a shear pin 166. A hopper 167 (see Figure 3-A) extends around the shaft 28 and sleeve 160, and its lower end (see Figure 3) fits onto the shoulder 168 in the wall 169 of the pocket casting (see Figure 10).

The plungers 131 are preferably truncated on their lower ends, as at 171, and provided with a collar 172 to which is affixed a rubber or other resilient stopper 173. This stopper, which is intended to seal the discharge opening 97, is removed when the bushing 98, shown in Figure 8, is inserted, and a stopper 174 affixed to the bottom of the collar 172, to give the same effect on the reduced discharge port. The plunger 131 is also provided with peripheral sealing grooves 176.

The operation of my improved can filling machine is as follows:

Cans A are placed horizontally in the magazine 33 where, by the action of the tilting plate 34 and worm 32, they are delivered in timed succession onto the table 31.

During the passage of the can along the worm 32, the can comes in contact with the trigger 129 which is forced outwardly, placing tension on the spiral spring 146, and through the movement thus occasioned on the parts 128, 124, 123 and 122, the switch 121 is moved over to align the outer flange 142 thereof with the outer lip of the groove in the track 99. The can which operates the trigger, and consequently the switch 121 is the can which will receive its charge from the pocket whose roller 139 is switched onto the track 99, where it begins its ascent along the dimension C, (see Figure 12) to the dimension K.

During this movement, the inlet or supply port 87 is aligned with the discharge port 155 of the magazine 150, so that the pocket is in communication with said magazine or chamber, and when the plunger rises, it forms a vacuum, drawing into said pocket and beneath said plunger a full charge from said magazine. The slight hump 177 in the track at the line between the dimensions C and K permits the plunger to rise a short distance higher than its natural stroke to take into the pocket a greater amount of material from the magazine than it is intended to place into the can to be filled therefrom.

It may sometimes happen that particularly viscous material will permit the plunger to rise a short distance before same enters the pocket, so that with this additional elevation of the plunger if more than the required quantity of material is taken into the pocket it will on the slight downward grade 177ᵃ of the roller 139 be forced back into the magazine or chamber 150.

Along the dimension M, the roller 139 travels along a horizontal part of the track, and as it enters upon the part of the track indicated by the dimension P, the upper part of the roller flange is engaged by the bearing plate 149 to hold the roller on the declining track indicated by the dimension P. At the time the roller starts to descend, the intake port 87 is no longer in communication with the discharge port 155 of the magazine, so that said intake port is closed, while the pocket discharge port 97 communicates with the arcuate port 94 in the sealing plate 91, so that the descending plunger discharges the entire contents from the pocket into the can A which is maintained thereunder by the star wheel 76.

When the plunger has completed its downward stroke, the rubber stopper 173 on the bottom thereof, will completely close the discharge port 97 of said pocket to prevent any dribbling of material from the pocket, while the can just filled will contact the arm 178 (see Figure 1) and will be transferred into the star wheel 152 and onto the can delivery table 151 from which it is passed to the capper for closing. The grooves 176 in the plunger will act as sealing rings, the material itself which oozes past the bottom of the piston entering said grooves and filling the same, thus acting as effectual piston rings to prevent any of the material from passing above the top of the plunger.

By virtue of the hand wheel 56 with the mechanism operated thereby, and the screw 30ᵃ abutting the bottom of the shaft 28 (see Figure 3), the parts described may be adjusted to prevent any binding and excessive friction, and also to provide for cans of different heights.

Furthermore, these adjustments may be utilized for cleaning the machine as follows: The arch 24 may be raised from the standard 23 by first removing the bolts 25, whereupon the magazine 150 may be drawn upward on the shaft and through the hopper and cleansed. The hand wheel 56 may then be operated to lower the turret plate 73 while the turret casting 78 secured to the shaft 28 at 82 will remain suspended above. When the flange 77 of the turret plate 73 is a sufficient distance below said turret, the sealing plate 91 may be raised to disengage it from the pins 93 when the opening 80 will permit the said plate to be drawn from the shaft 28 and removed for cleansing. At this time, the turret plate 73 and turret 78 may also be cleaned, and the sealing plate 91 returned to its position in the turret plate 73.

The track switch 121 and operative mechanism will prevent the roller on the plunger of any particular pocket from ascending the upper incline of the track, indicated by the dimension C, when the can corresponding to any particular pocket is not received into the worm or feed screw 32. Therefore, this mechanism acts as an effective "no can—no fill" means.

Of course, the can filling machine herein illustrated and described may be modified and changed in various ways without departing from the invention herein set forth and hereafter claimed.

The invention is hereby claimed as follows:

1. A can filling machine comprising a stationary supply chamber having a discharge port in the outer wall thereof, a turret having a plurality of pockets adapted to revolve around the outside of said chamber, each pocket having an admission port adapted to communicate with the chamber discharge port during a part of each revolution, each pocket having a discharge port, a stationary plate below and adjacent said turret, said plate having a discharge opening removed from the port in said chamber, a reciprocating plunger in each of said pockets to draw a charge of material into the pocket and discharge same through the discharge port thereof and the opening in said plate, and means to operate said plungers.

2. A can filling machine comprising a stationary supply chamber having a discharge port in the outer wall thereof, a turret having a plurality of pockets adapted to revolve around the outside of said chamber, each pocket having an admission port adapted to communicate with the chamber discharge port during a part of each revolution, each pocket having a discharge port in the bottom, a stationary plate below and adjacent said turret, said plate having a discharge opening removed from the port in said chamber, a reciprocating plunger in each of said pockets for creating a vacuum to draw a charge of material into the pocket and discharge same through the discharge port thereof and the opening in said plate, and means to operate said plungers.

3. A can filling machine comprising a stationary supply chamber having a discharge port in the outer wall thereof, a turret having a plurality of pockets adapted to revolve around the outside of said chamber, each pocket having an admission port adapted to communicate with the chamber discharge port during a part of each revolution, each pocket having a discharge port, a stationary plate below and adjacent said turret, said plate having a discharge opening removed from the port in said chamber and sealing the discharge ports in said pockets during communication of pockets with said supply chamber, a reciprocating plunger in each of said pockets to draw a charge of material into the pocket and discharge same through the discharge port thereof and the opening in said plate, and means to operate said plungers.

4. A can filling machine comprising a frame, a supply chamber anchored to said frame, a single discharge port in the outer wall thereof, a central shaft, a turret having measuring pockets secured to said shaft and adapted to revolve around said chamber, each pocket having an admission port adapted to communicate with the chamber port during a part of each revolution, each pocket having a discharge port, a stationary plate below and adjacent said turret, said plate having a discharge opening removed from the port in said chamber, a reciprocating plunger in each of said pockets to draw a charge of material into the pocket and discharge same through the discharge port thereof and the opening in said plate, and means to operate said plungers.

5. A can filling machine comprising a stationary supply chamber having a discharge port in the outer wall thereof, a turret having a plurality of pockets adapted to revolve around said chamber, each of said pockets having an admission port adapted to communicate with the chamber port during a part of each revolution, each pocket having a discharge port, a stationary plate below said turret having a discharge opening removed from the port in said chamber, a turret plate below said stationary plate and rotatable therewith, an upstanding flange on said turret plate adapted to embrace the bottom of said turret and conceal said stationary plate, a reciprocating plunger in each of said pockets to draw a charge of material into the pocket and discharge same through the discharge port thereof and the opening in said plate, means to operate said plungers, and means to regulate the length of the plunger stroke.

6. A can filling machine comprising a frame, a supply chamber anchored to said frame, a single discharge port in the outer wall thereof, a central shaft, a turret having measuring pockets secured to said shaft and adapted to revolve around said chamber, each of said pockets having an admission port adapted to communicate with the chamber port during a part of each revolution, each pocket having a discharge port, a stationary plate below said turret having a discharge opening removed from the port in said chamber, a turret plate below said stationary plate and rotatable therewith, an upstanding flange on said turret plate adapted to embrace the bottom of said turret and conceal said stationary plate, a reciprocating plunger in each of said pockets to draw a charge of material into the pocket and discharge same through the discharge port thereof and the opening in said plate, means to operate said plungers, and means to regulate the length of the plunger stroke.

7. A can filling machine comprising a stationary supply chamber having a discharge port in the outer wall thereof, a turret having a plurality of pockets adapted to revolve around said chamber, each of said pockets having an admission port adapted to communicate with the chamber port during a part of each revolution, each pocket having a discharge port, a stationary plate below said turret having a discharge opening removed from the port in said chamber, a turret plate between said stationary plate and rotatable therewith, an upstanding flange on said turret plate adapted to embrace the bottom of said turret and conceal said stationary plate, a reciprocating plunger in each of said pockets to draw a charge of material into the pocket and discharge same through the discharge port thereof and the opening in said plate, said plungers each provided with a roller, a track on which said rollers operate to reciprocate said plungers, and means for changing the elevation of said track to regulate the length of the plunger stroke.

8. A can filling machine comprising a frame, a supply chamber anchored to said frame, a single discharge port in the outer wall thereof, a central shaft, a turret having measuring pockets secured to said shaft and adapted to revolve around said chamber, each of said pockets having an admission port adapted to communicate with the chamber port during a part of each revolution, each pocket having a discharge port, a stationary plate below said turret having a discharge opening removed from the port in said chamber, a turret plate below said stationary plate and rotatable therewith, an upstanding flange on said turret plate adapted to embrace the bottom of said turret and conceal said stationary plate, a reciprocating plunger in each of said pockets to draw a charge of material into the pocket and discharge same through the discharge port thereof and the opening in said plate, said plungers each provided with a roller, a track on which said rollers operate to reciprocate said plungers, and means for changing the elevation of said track to regulate the length of the plunger stroke.

9. A can filling machine comprising a stationary supply chamber having a discharge port in the outer wall thereof, a turret having a plurality of pockets adapted to revolve around said chamber, each pocket having an admission port adapted to communicate with the chamber port during a part of each revolution, each pocket having a discharge port, a stationary plate below said turret having a discharge opening removed from the port in said chamber, a turret plate below said stationary plate and rotatable therewith, an upstanding flange on said turret plate adapted to embrace the bottom of said turret and conceal said stationary plate, a reciprocating plunger in each of said pockets to draw a charge of material into the pocket and discharge same through the discharge port thereof and the opening in said plate, said plungers each provided with a roller, a track on which said rollers operate to reciprocate said plungers, said track being hingedly mounted at one side, and means for elevating and lowering the other side of said track to increase or decrease the upward stroke of the plungers.

10. A can filling machine comprising a stationary supply chamber having a single port in the outer wall thereof, a turret having a plurality of pockets adapted to revolve around said chamber, each pocket having an admission port adapted to communicate with the chamber port during a part of each revolution, each pocket having a discharge port, a stationary plate below said turret having a discharge opening removed from the port in said chamber and sealing the discharge ports in said pockets during the communication of said pockets with said supply chamber, a rotatable turret plate below said stationary plate, a reciprocating plunger in each of said pockets to draw a charge of material into the pocket and discharge same through the discharge port thereof and the opening in said plate, said plungers each provided with a roller, a track on which said rollers operate to reciprocate said plungers, said track being hingedly mounted at one side, and screw means for elevating and lowering the other side of said track to increase or decrease the upward stroke of the plungers.

11. In a can filling machine having a can supporting table and mechanism for revolving cans beneath filling mechanism, a supply chamber having a single discharge port in the wall thereof, a turret having a plurality of pockets adapted to revolve around said chamber, each pocket having an admission port adapted to communicate with the chamber port during a part of each revolution, each pocket having a discharge port, a stationary plate below said turret having a discharge opening removed from the port in said chamber and sealing the discharge ports in said pockets during communication of pockets with said supply chamber, a turret plate below said stationary plate and rotatable therewith, an upstanding flange on said turret plate adapted to embrace the bottom of said turret and conceal said stationary plate, a reciprocating plunger in each of said pockets, means to reciprocate said plungers to draw a charge of material into successive pockets and to discharge same through the discharge port and opening into said cans, and means to elevate or lower the chamber and turret mechanism from and toward said table to accommodate cans of different heights.

12. In a can filling machine having a can supporting table and mechanism for revolving cans beneath filling mechanism, a supply chamber having a single discharge port in the wall thereof, a turret having a plurality of pockets adapted to revolve around said chamber, each pocket having an admission port adapted to communicate with the chamber port during a part of each revolution, each pocket having a discharge port, a stationary plate below said turret having a discharge opening removed from the port in said chamber and sealing the discharge ports in said pockets during communication of pockets with said supply chamber, a turret plate below said stationary plate and rotatable therewith, an upstanding flange on said turret plate adapted to embrace the bottom of said turret and conceal said stationary plate, a reciprocating plunger in each of said pockets, means to reciprocate said plungers to draw a charge of material into successive pockets and to discharge same through the discharge port and opening into said cans, and means extending through said table and having a manually operable screw threaded means to elevate and lower said chamber and turret mechanism in relation to said table.

13. In a can filling mechanism having a can supporting mechanism for revolving cans beneath filling mechanism and means for feeding cans to said table, a supply chamber, a turret having measuring pockets, a plunger in each pocket for drawing material from said chamber into said pockets and for discharging same into said cans, a roller connected with each plunger, a track upon which said rollers operate to reciprocate said plungers, a switch in said track, means operated by each can in its passage through the can feeding means to throw said switch to retain on the track the roller of the plunger in the pocket to be emptied into the switch operating can, said switch remaining inoperative in the absence of a can in the can feeding mechanism whereby the roller on the corresponding plunger is switched from said track and remains stationary in its pocket.

14. In a can filling mechanism having a can supporting mechanism for revolving cans beneath filling mechanism and means for feeding cans to said table, a supply chamber, a turret having measuring pockets, a plunger in each pocket for drawing material from said chamber into said pockets and for discharging same into said cans, a roller connected with each plunger, a track upon which said rollers operate to reciprocate said plungers, a switch in said track, a trigger operated by each can in its passage through the can feeding means, said trigger provided with a rod connecting and adapted to throw said switch to retain on the track the roller of the plunger in the pocket to be emptied into the switch operating can, said switch remaining inoperative in the absence of a can in the can feeding mechanism whereby the roller on the corresponding plunger is switched from said track and remains stationary in its pocket.

15. In a can filling machine having a central magazine for material to be deposited in cans, a turret rotatable around said magazine and having measuring pockets, a plunger in each of said pockets for drawing said supply from said chamber, a cam track, rollers connecting said plungers and engaging said cam track, means on said track to raise said plungers to draw into said pockets amounts of material greater than the amounts to be deposited in said cans, means for returning the excess to said supply chamber, and means on said track for thereafter operating said plungers to discharge the contents of said pockets.

16. In a can filling machine having a central magazine for material to be deposited in cans, a turret rotatable around said magazine and having measuring pockets, a plunger in each of said pockets for drawing said supply from said chamber, a cam track, rollers connecting said plungers and engaging said cam track, an elevator on said track to raise said plungers to draw into said pockets amounts of material greater than the amounts to be deposited in said cans, and a declivity on said track to lower said plungers for returning the excess to said supply chamber.

17. In a can filling machine having a central shaft and a stationary central magazine for material to be deposited in cans, a turret rotatable around said chamber and provided with measuring pockets having a discharge port at their bottoms, a stationary sealing plate having a discharge opening and adapted to seal the bottoms of said pockets when same are taking a charge, a rotary turret plate supporting said sealing plate, said magazine being detachably mounted, and means for lowering said turret plate from said turret and for removing said sealing plate.

18. In a combination with a can filling machine having a central shaft and a central stationary supply magazine for material to be deposited into cans, a rotatable turret having measuring pockets, and a rotary turret plate with which said turret rotates, a stationary sealing plate having a discharge opening and adapted to seal the bottoms of the pockets when same are being filled, said sealing plate having a slot for removing same from around said shaft, and an insert on said turret plate for closing said slot when said sealing plate is in position.

19. A can filling machine having a rotary turret with open bottom measuring pockets, a stationary member having a discharge opening and an area acting as a seal for pockets not in communication with said opening, and a rotating flanged member below and adjacent said stationary member and co-acting with said turret to completely envelop the sealing and discharge elements of said stationary member.

20. A can filling machine having a rotary turret with open bottom measuring pockets, a stationary member having a discharge opening and a circular periphery, and a rotating flanged member below and adjacent said stationary member and co-acting with said turret for peripherally enclosing said stationary member.

21. A can filling machine having a rotary turret with open bottom measuring pockets, a stationary member having a discharge opening and an area acting as a seal for pockets not in communication with said opening, a rotating flanged member below and adjacent said stationary member and co-acting with said turret to completely envelop the sealing and discharge elements of said stationary member, and means for holding said stationary member against rotation.

22. A can filling machine having a rotary turret with open bottom measuring pockets, a stationary member having a discharge opening and a circular periphery, a flanged member rotating with said turret and located immediately below said stationary member and co-acting with said turret for peripherally enclosing said stationary member, and means for holding said stationary member against rotation.

23. A can filling machine having a rotary turret with open bottom measuring pockets, a stationary member having a discharge opening and an area acting as a seal for pockets not in communication with said opening, a flanged member rotating with said turret and located immediately below said stationary member and co-acting with said turret to completely envelop the sealing and discharge elements of said stationary member, and means centrally located for holding said stationary member against rotation.

24. A combined sealing and discharge plate for a can filling machine, comprising a central bushing having a horizontal flange, pins in said flange, a circular disk having a central opening around said shaft and having openings for fitting onto the pins of said flange, said disk having a radial slot extending from the central opening to the periphery, and a plate fastened on said flange and normally filling at least a part of said radial slot when the disk is in position thereon, said disk when raised to disengage the pins from said holes being removable from said shaft intermediate the ends thereof.

25. A sealing and discharge plate for a can filling machine, said plate being circular and having a discharge opening and a central opening for surrounding a shaft, said plate having a radial slot slightly wider than the diameter of said shaft and extending from said central opening to the periphery of said plate whereby said plate may be detached from the shaft intermediate the ends of said shaft.

CHARLES H. AYARS.